July 28, 1964
K. LAWRENCE
3,142,311
FLUID FLOW CONTROL SHUT-OFF DEVICE
Filed Feb. 2, 1962
2 Sheets-Sheet 1
FIG. 1
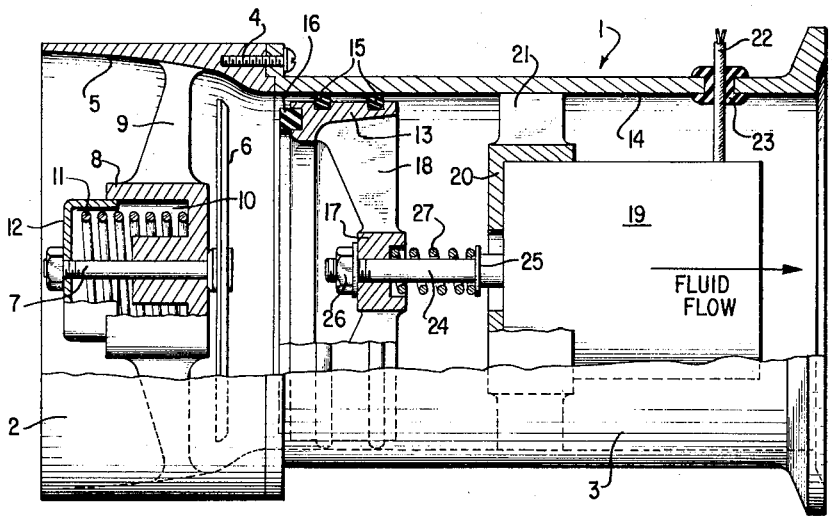
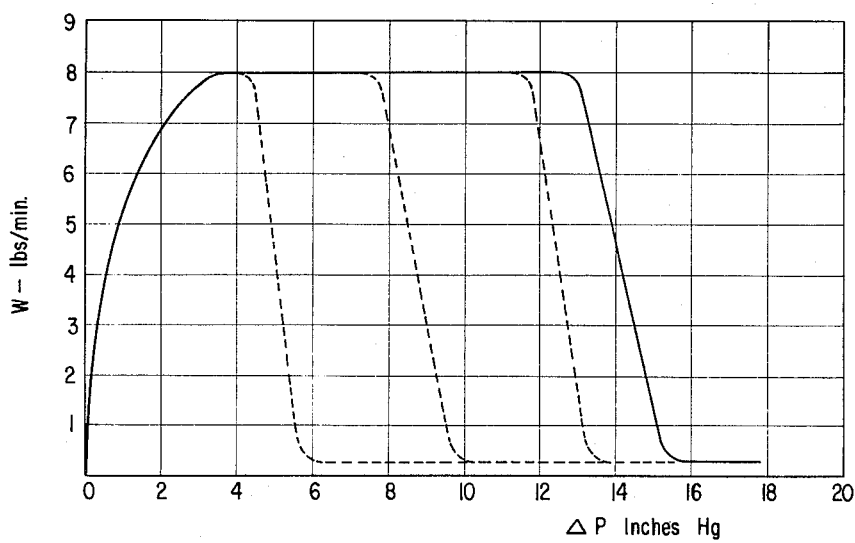
FIG 4
FIG. 2
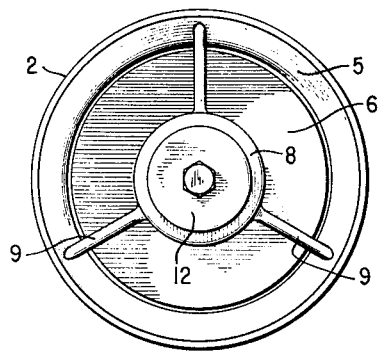
INVENTOR.
KURT LAWRENCE
BY *Robert B. Harmon*
ATTORNEY

INVENTOR.
KURT LAWRENCE

BY *Robert B. Harmon*

ATTORNEY

United States Patent Office 3,142,311
Patented July 28, 1964

3,142,311
FLUID FLOW CONTROL SHUT-OFF DEVICE
Kurt Lawrence, Groton, Conn., assignor to General Dynamics Corporation, New York, N.Y., a corporation of Delaware
Filed Feb. 2, 1962, Ser. No. 170,634
5 Claims. (Cl. 137—517)

The present invention relates in general to automatic flow control valves for fluid flow systems and more particularly to selectively operable overriding shut-off devices for such valves. Flow control valves of the type involved in the present invention find utility in fluid systems wherein a predetermined or a relatively constant mass flow is desired regardless of the pressure differential across the valve within preset limits. The usual flow control valve constitutes a valve member which rides against a calibrated spring system and is sensitive to the pressure differential between the upstream and the downstream sides of the valve for varying the position of the valve member in response to changes in the pressure in order to maintain the constant flow rate. The flow control valve is designed to automatically shut off the flow at a preset maximum pressure differential by seating itself against a valve seat in response to the predetermined fluid pressure acting against the spring system of the valve member.

The known prior art methods for overriding the action of an automatic flow control valve, to shut off the fluid flow at any desired pressure differential below the preset maximum at which the flow control valve will shut itself off, is to force the poppet valve member against its spring system to a fixed stationary seal or valve seat and to keep it there by a locking device or continuous application of power. As is apparent to those skilled in the art, such a shut-off operation involves a considerable amount of power required to force the valve member against its spring system and to continuously hold the valve in the shut-off position. It is also readily apparent that the power requirement for such an operation would be variable, depending upon the initial position of the valve at the time shut off was desired. Other and more serious disadvantages of this method are the vibrations or surges in the system which occur during the shut-off operation and the "hunting" of the valve member as it seeks out its "normal" position for a given pressure differential during the reopening of the valve. The surges in flow rate which result from the "hunting" action of the valve member during a reopening are not only objectionable but may pose very serious problems depending upon the character and sensitivity of the fluid system.

The present invention contemplates a simply constructed shut-off device for flow control valves of the type under consideration which will allow the flow to be shut off manually from a convenient control center with a minimum of power expenditure. The device of the present invention will provide a steady and even rate of change of flow during the shut-off and reopening operations resulting in the elimination of the surge effects and the so-called "hunting" of the valve member while seeking its normal position. In the structure of the present invention both the valve member and the valve seat are movably mounted within the flow passage and are independently spring biased with manually controlled linear actuator means being connected to the movable valve seat through its spring system, whereby the valve seat may follow the valve member as it shifts within the valve passage during the shut-off period. With this structure, the valve member will at all times be responsive to changes in the pressure differential across the valve opening. The valve member thus remains approximately in the position required for correct weight flow at the particular pressure differential thereby eliminating the "hunting" and resulting surge flow during opening and closing of the valve. Although the present invention finds special utility in gaseous flow systems, the device is not limited to such application and finds utility in fluid flow systems in general.

This invention thus has for its primary object the presentation of novel and useful improvements in the efficiency and effectiveness of manually controlled shut-off devices for automatic flow control valves.

Another object of the present invention is to provide a manually controlled shut-off device for a flow control valve which produces an even and steady rate of change in the flow past the valve during the closing and reopening of the valve.

A further object of the present invention is to provide a manually controlled shut-off device for a flow control valve which eliminates hunting the valve member during the reopening operation and which eliminates surge flow during opening and closing of the valve.

A further object of the present invention is the provision of a shut-off device for a flow control valve which requires minimum power expenditures for actuation and which is operable under a constant power output to the actuator.

A further object of this invention is a provision of a shut-off device for a flow control valve which is capable of actuation by an actuator of a small and light construction for reduction of size, weight and cost of the entire unit.

A further object of the present invention is to provide a shut-off device for an automatic flow control valve which can be manually actuated at any selected pressure differential and wherein the valve seat is shifted against the valve member for closing the valve.

A still further object of the present invention is to provide a flow control valve shut-off device wherein the flow control valve member and the valve seat are independently spring urged and wherein the valve seat is actuated by means of a powered actuator connected to the seat by a resilient connection.

The means by which the foregoing objects and other advantages, which will be apparent to those skilled in the art, are accomplished are set forth in the following specification and claims and are illustrated in the accompanying drawings dealing with the preferred embodiment. Reference is now made to the accompanying drawings in which:

FIGURE 1 is a partially sectioned side elevation of the entire unit including the automatic flow control valve and the shut-off device.

FIGURE 2 is an end elevation showing the flow control valve disc and mounting.

Figure 3A:
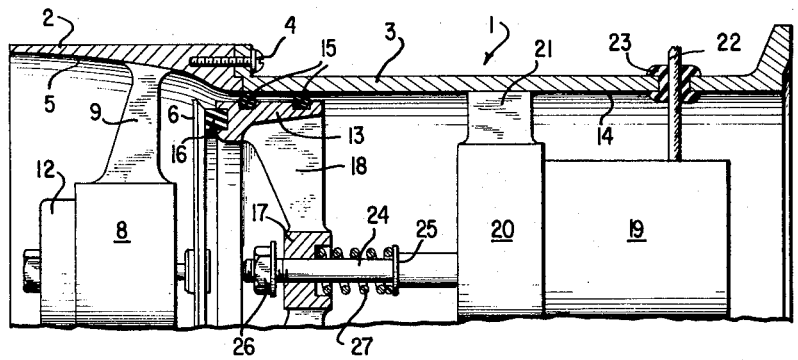
FIGURE 3a is a fragmentary cross-sectional view of the flow control valve and the shut-off device in the closed position.
Figure 3B:
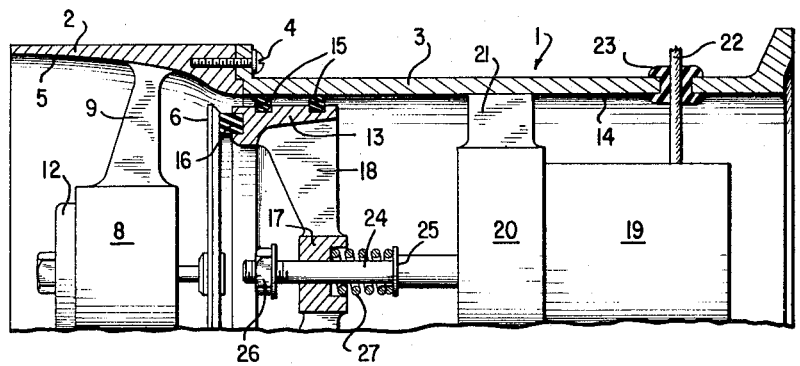
FIGURE 3b is a fragmentary cross-section similar to FIGURE 3a under conditions of increased pressure differental across the valve.
Figure 3C:
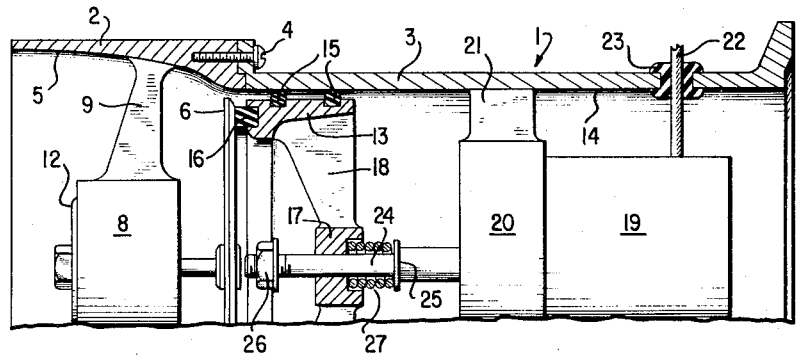

FIGURE 3c has a fragmentary cross-section similar to FIGURE 3a under conditions of maximum pressure differential across the valve.

FIGURE 4 shows the performance of the automatic flow control valve without the shut-off device with performance curves of the flow control valve under operation of the shut-off device being shown by the dotted line portions.

Referring now to the drawings, wherein like reference numerals are used to indicate identical parts in various views, the preferred embodiment of the invention, shown in FIGURE 1, comprises a control valve and shut-off device housing indicated generally by the numeral 1. The housing unit 1 may be made of an integral construction or, as shown in the drawings, may be fabricated from two separate sections including a control valve housing 2 and a seating ring and actuator housing 3 assembled in fluid tight relation by means of screw members 4, for ease of manufacture. The entire housing unit 1 in practice will be designed to be inserted within a fluid pressure conduit of the particular system for which the device is utilized. The direction of fluid flow for the particular embodiment illustrated will be from the left to the right as indicated by the directional arrow in FIGURE 1.

The internal bore 5 of the cylindrical valve housing 2 is bell-shaped as illustrated in FIGURE 1 for the reception of an axially shiftable control valve disc 6. The valve disc 6 is attached to a slidable valve stem 7 which is slidably supported by a centrally located hub 8 positioned within the housing 2 by means of integral web members 9, three of which are shown in FIGURE 2. The hub 8 further includes an annular channel 10 for the reception of a calibrated spring 11, although two or more springs (not shown) may be used if desired, which seats in the bottom of the channel 10 and bears against a cup-shaped backing ring 12 secured to the valve stem 7 and designed to be telescoped within the annular channel 10 of the hub.

With the structure thus far described, it will be understood that the axially shiftable valve disc 6 will be free to shift within the contoured bellmouth of the bore 5 responsive to the pressure difference between housing 2 and the housing 3. The valve disc 6, as it is moved by the fluid pressure on the upstream side thereof, rides against the calibrated spring system provided by the helical spring 11 to maintain a constant mass flow of fluid regardless of the pressure differential across the valve. As it is well understood in the art, the flow will remain substantially constant past the valve until a predetermined maximum pressure difference is obtained, at which point the valve disc 6 would normally seat itself against a fixed seat.

Looking now to the structure within the housing 3, an annular seating ring 13 is mounted for reciprocating movement therein. The seating ring 13 is in sealing engagement with the bore 14 of housing 3 and is provided with two O-ring seals 15 which are of a well known type and may be composed of Teflon or any other suitable material. Since the number of O-ring seals used are dependent upon the desired leakage rate, the quantity of O-ring seals used will depend upon design conditions. The upstream face of the seating ring 13 has an annular insert rubber seal 16 affixed thereto which is designed to engage the downstream face of the valve disc 6 in the shut-off position presently to be described. The seating ring 13 further includes the hub 17 centrally positioned by means of several web structures 18. The ring 13, the hub 17 and the webs 18 may be of an integral construction such as a unitary casting for ease of manufacture. A linear actuator motor 19 is also supported within the housing 3 and is located downstream from the seating ring 13. The actuator 19 is suspended within the housing 3 by means of support structure 20 spaced from the internal wall of the housing by means of a plurality of webs 21 in a well known manner. Electrical lead wires 22 extend from the actuator 19 and pass through the walls of the housing 3 with a sealing grommet 23 being provided between the lead wires 22 and the walls of the housing. The electrical leads 22 will normally be connected to a control panel whereby the actuator may be remotely controlled at the will of an operator. The linear actuator 19 can be of any commercially available design which includes a reciprocating actuator rod 24 having a backing washer 25 rigidly affixed thereto. An adjustable stop member 26 is located on the terminal portion of the rod 24 for a purpose to be described.

As most clearly illustrated in FIGURES 3a, 3b and 3c, the actuator rod 24 is slidably received in a suitable bore within the hub 17 of the seating ring 13 and is designed for limited movement relative thereto between the stop washer 25 and the adjustable member 26 carried by the rod 24. A resilient connection is maintained between the actuator rod 24 and the seating ring 13 by means of the helical compression spring 27 which abuts the washer 25, surrounds the rod 24 and seats against the hub 17 of the seating ring. The linear actuator 19 is designed to be at rest in either the fully extended position as shown in FIGURES 3a, 3b or 3c, or in a fully retracted position, as shown in FIGURE 1.

In operation, the present device provides for the normal operation of a standard flow control valve with a stationary seat and, in addition, enables an operator to close the valve port by energizing the shut-off device of the present invention at any desired pressure differential. With the linear actuator rod 24 being in the retracted or inactive position, as shown in FIGURE 1, the seating ring 13 with its seal 16 will provide the normal stationary valve seat against which the valve disc 6 will seat at a preset maximum pressure differential. As will be understood by those skilled in the art, the valve disc 6 will seek a position between its fully retracted position shown in FIGURE 1 and a closed position against the seal 16 to maintain a constant flow rate determined by the pre-calibrated spring system 11 for any given pressure differential. The position of the disc 6 will vary between its limits in the event that the pressure differential varies so that the flow rate will remain constant within the predetermined range of pressure differentials. The bellmouth contour of the bore 5 is designed to cooperate with the valve disc 6 for this purpose.

The performance of the flow control valve under the conditions just described is illustrated graphically by the solid line curve of FIGURE 4, wherein the values of pressure differential in inches of Hg across the valve have been placed on the horizontal and the mass or weight flow values in pounds per minute have been placed on the vertical scale. As illustrated in FIGURE 4, with the valve open, the rate of flow sharply increases to the desired rate as the pressure differential increases and the flow rate then remains constant until a maximum predetermined pressure differential is approached. The pre-calibrated spring system against which the valve member rides will, of course, determine the constant flow rate and will also determine the value at which the valve member will close automatically. As seen in FIGURE 4, when the pre-determined maximum pressure differential is approached, the valve member closes very rapidly and the flow rate then drops sharply from the constant value to zero except for whatever leakage factor is present.

In the event that the operator wishes to shut off the flow past thet valve at any given pressure differential below the maximum value at which the flow control valve will automatically shut itself off, it is merely necessary to energize the linear actuator to extend the actuator rod 24 to the left as viewed in the drawings. In all cases the actuator rod will travel to its fully extended position as illustrated in FIGURES 3, 3b and 3c. Regardless of what position the valve disc is in at the moment of actuation of the linear actuator, the seating ring 13 will contact the disc 6 and effectively shut off the flow past the valve. As shown in FIGURE 3a, the fully extended position of the actuator rod 24 will enable the seating ring 13 to sealingly engage the valve disc in its fully retracted position to the extreme left and, as shown in FIGURE 3c, the extension of the actuator rod 24 will not interfere with the valve disc 6 even though the valve disc is in its fully extended position to the extreme right, with the spring system 11 being fully compressed.

Referring now to FIGURES 3a, 3b and 3c, the cooperation between the shiftable seating ring and the flow control valve 6 during the shut-off period will be described. Referring to FIGURE 3a, the actuator rod 24 will be moved to its fully extended position for the purpose of shutting off the flow past the valve and the seating ring 13 will contact the valve disc 6 regardless of its position, which is shown to be fully retracted for purposes of illustration in FIGURE 3a. If the pressure differential should increase from the value which determined the position of the valve disc 6 at shut-off time, the increased pressure on the upstream side of the valve disc will force the valve disc to the right as shown in FIGURE 3b, and due to the resilient connection between the seating ring 13 and the actuator rod 24, the seating ring 13 will follow the valve disc 6 to its newly balanced position. Should the operator desire to open the valve at this point, the valve disc would be in its proper position for maintaining a constant flow rate at the increased pressure differential, thus eliminating the process of hunting which would normally occur if the valve disc 6 had remained at its initial position at the time of shut off. As shown in FIGURE 3c, the seating ring 6 will follow the pressure sensitive valve disc 6 as it moves to its fully extended position at which time the spring system 11 will be fully compressed and the backup spring 27 will also be fully compressed. The actuator rod 24 will, however, remain in its fully extended position until such time as the operator energizes the linear actuator 19.

The dotted line curves shown in FIGURE 4 represent the performance of the valve when the shut-off device of the present invention is activated to close the valve prior to reaching the predetermined maximum pressure differential. The decrease in flow rate during manual shut off is seen to be even and constant as in the case of the automatic shut-off operation shown by the sold line curve. This result is obtainable with the present invention, regardless of the pressure differential at which the linear actuator is energized as represented by the several dotted line curves.

It will be readily apparent to those skilled in the art that the present invention provides novel and useful improvements in automatic flow control shut-off devices of the character described. The elimination of surge flow and other disturbances in gas or other fluid flow past the valve during the closing and reopening of the control valve provides many advantages not found in the prior art and constitutes a substantial improvement in the operation of valves of the character dealt with. It will also be appreciated by those familiar with the art involved that many advantages are to be gained by the reduction in size and weight of the actuator required for the present invention due to the low power requirements for sliding the sealing ring. The decrease in power requirement is possible since the actuator must overcome only the friction force of a sliding seal and need not compress the main valve spring of the valve disc. The arrangements and types of structural components utilized within the invention may be subject to numerous modifications well within the purview of this invention and applicant intends only to be limited to a liberal interpretation of the specification and appended claims.

Having thus described the invention, what is claimed as new and desired to be secured by Letters Patent is:

1. A flow control valve comprising;
   (a) a valve housing,
   (b) said housing including a bore having a bell-shaped portion and a reduced diameter portion,
   (c) a valve disc in said bell-shaped portion,
   (d) a valve stem connected to said valve disc and extending upstream therefrom,
   (e) mounting means for slidably receiving said valve stem,
   (f) a precalibrated compression spring seated against said mounting means and acting against said valve stem for biasing said valve disc against the fluid pressure in said housing,
   (g) a seating ring slidably disposed within said reduced diameter portion of said bore,
   (h) means for maintaining a fluid seal between said ring and said bore,
   (i) an annular compressible seal located on the upstream face of said seating ring and adapted to cooperate with said valve disc for closing off the fluid flow past said valve disc,
   (j) an electrically powered linear actuator mounted in said bore and including an axially extending actuator rod,
   (k) and means for providing a resilient connection between said actuator rod and said seating ring,
   (l) whereby said seating ring may be advanced to seat against said valve disc regardless of the position thereof with axial shifting of said disc and seating ring being permitted while in the seated relation.

2. A flow control valve comprising;
   (a) a valve housing,
   (b) said housing including a bore having a reduced diameter portion,
   (c) a valve disc,
   (d) means to slidably mount said valve disc within said housing upstream from said reduced diameter portion,
   (e) a precalibrated spring system carried by said mounting means for biasing said valve disc against fluid pressure within said housing,
   (f) a slidable seating ring located in said reduced diameter portion,
   (g) sealing means located between said ring and the bore of said housing,
   (h) a seating ring actuator within said housing and including an axially reciprocable actuator rod,
   (i) and a resilient connecting means between said actuator rod and said seating ring,
   (j) whereby said ring may be advanced to seating engagement with said disc regardless of the position of said disc,
   (k) said resilient connecting means permitting axial shifting of said ring and said disc while in seating relation within said reduced diameter portion.

3. A flow control valve comprising;
   (a) a valve housing,
   (b) said housing including an axially extending through bore having a bell-shaped portion, said bell-shaped portion being located intermediate an enlarged diameter upstream portion and a reduced diameter downstream portion of the bore,
   (c) a valve disc mounted for reciprocating movement axially of the housing in said bell-shaped portion of the housing,
   (d) a precalibrated spring coacting with said valve disc to bias said disc against axially flowing fluid under pressure in said bore,
   (e) a seating ring mounted for free reciprocating movement in the reduced diameter of the valve housing, and being in peripheral sealed relationship with said bore during such movement,
   (f) said ring including a seating surface extending into the bell-shaped portion of the housing to coact with said valve disc in varying positions of said disc under changing pressure differential conditions about said disc to close off fluid flow through the valve,
   (g) and motive means located in the reduced diameter portion of the valve housing to shift the seating ring axially of the bore, whereby the seating surface thereof will seat against the valve disc regardless of the position of the disc in the bell-shaped portion of the housing.

4. The invention according to claim 3 wherein said motive means comprises a remotely controlled actuator.

5. The invention according to claim 4 wherein a resilient connection is provided between said seating ring and said actuator whereby both said valve disc and seating ring may shift axially of the valve while in a seated, valve closed condition under varying pressure conditions in the valve.

References Cited in the file of this patent

UNITED STATES PATENTS

| | | |
|---|---|---|
| 614,441 | Burnett | Nov. 27, 1898 |
| 1,119,042 | Ricketts | Dec. 1, 1914 |
| 1,583,140 | Goosman | May 4, 1926 |
| 2,804,881 | Seid | Sept. 3, 1957 |
| 2,882,924 | Kleczek | Apr. 21, 1959 |

FOREIGN PATENTS

| | | |
|---|---|---|
| 495,166 | Belgium | Aug. 1, 1950 |